(12) United States Patent
Fong et al.

(10) Patent No.: US 8,645,871 B2
(45) Date of Patent: Feb. 4, 2014

(54) TILTABLE USER INTERFACE

(75) Inventors: Jeffrey Fong, Seattle, WA (US);
Thamer Abanami, Seattle, WA (US);
Michael Van Robb Johnson, Jr.,
Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 963 days.

(21) Appl. No.: 12/276,153

(22) Filed: Nov. 21, 2008

(65) Prior Publication Data
US 2010/0131904 A1 May 27, 2010

(51) Int. Cl.
*G06F 3/033* (2013.01)
(52) U.S. Cl.
USPC .......................................... 715/863
(58) Field of Classification Search
USPC ................................. 715/863, 864
See application file for complete search history.

(56) References Cited

U.S. PATENT DOCUMENTS

| | | | | |
|---|---|---|---|---|
| 5,426,732 A * | 6/1995 | Boies et al. | .................... | 715/839 |
| 6,466,198 B1 * | 10/2002 | Feinstein | ..................... | 345/158 |
| 6,690,358 B2 | 2/2004 | Kaplan | | |
| 6,798,429 B2 * | 9/2004 | Bradski | .......................... | 345/156 |
| 7,038,662 B2 | 5/2006 | Noguera | | |
| 7,248,269 B2 | 7/2007 | Card et al. | | |
| 7,301,528 B2 | 11/2007 | Marvit et al. | | |
| 7,564,469 B2 * | 7/2009 | Cohen | ........................... | 345/632 |
| 7,631,277 B1 * | 12/2009 | Nie et al. | ...................... | 715/848 |
| 2004/0145613 A1 * | 7/2004 | Stavely et al. | ................ | 345/863 |
| 2005/0210417 A1 * | 9/2005 | Marvit et al. | .................. | 715/863 |
| 2006/0010699 A1 | 1/2006 | Tamura | | |
| 2006/0094480 A1 | 5/2006 | Tanaka | | |
| 2006/0178212 A1 * | 8/2006 | Penzias | .......................... | 463/37 |
| 2006/0187204 A1 | 8/2006 | Yi et al. | | |
| 2007/0113207 A1 * | 5/2007 | Gritton | ......................... | 715/863 |
| 2008/0042973 A1 * | 2/2008 | Zhao et al. | ..................... | 345/156 |
| 2008/0062001 A1 | 3/2008 | Hsu et al. | | |
| 2009/0002391 A1 * | 1/2009 | Williamson et al. | .......... | 345/619 |
| 2009/0201270 A1 * | 8/2009 | Pikkujamsa et al. | .......... | 345/184 |
| 2009/0265627 A1 * | 10/2009 | Kim et al. | ..................... | 715/702 |
| 2009/0307634 A1 * | 12/2009 | Strandell | ....................... | 715/863 |
| 2009/0322676 A1 * | 12/2009 | Kerr et al. | ..................... | 345/158 |
| 2010/0042954 A1 * | 2/2010 | Rosenblatt et al. | ........... | 715/863 |
| 2010/0171691 A1 * | 7/2010 | Cook et al. | .................... | 345/156 |

FOREIGN PATENT DOCUMENTS

| | | |
|---|---|---|
| JP | 11065806 A | 3/1999 |
| JP | 2000311174 A | 11/2000 |

OTHER PUBLICATIONS

ISA Korea, International Search Report of PCT/US2009/061745, Apr. 30, 2010, 3 pages.
"'Tilt-and-Scroll' Technology for Smartphones and Other Handheld Devices", Retrieved on Sep. 2, 2008, Webpage available at :- http://www.rotoview.com/.

(Continued)

*Primary Examiner* — Thanh Vu
(74) *Attorney, Agent, or Firm* — Alleman Hall McCoy Russell & Tuttle LLP

(57) ABSTRACT

A programmable effects system for graphical user interfaces is disclosed. One embodiment comprises adjusting a graphical user interface in response to a tilt of a device. In this way, a graphical user interface may have viewable content not shown in a first view, where the viewable content may be displayed in a tilted view in response to the device tilt.

14 Claims, 3 Drawing Sheets

(56) References Cited

OTHER PUBLICATIONS

Kelsey, Michelle A., "Expand Your Gaming Space with Sensors", Dated: May 24, 2007, Webpage available at :- http://electronics.sensorsmag.com/sensorselectronics/Consumer+Products/Expand-Your-Gaming-Space-with-Sensors/ArticleStandard/Article/detail/430006.

Rekimoto, Jun, "Tilting Operations for Small Screen Interfaces", Proceedings of the 9th annual ACM symposium on User Interface Software and Technology, Year of Publication: 1996, pp. 167-168.

Hinckley, et al., "Sensing Techniques for Mobile Interaction", Proceedings of the 13th annual ACM symposium on User Interface Software and Technology, Year of Publication: 2000, pp. 91-100.

\* cited by examiner

TILTABLE USER INTERFACE

BACKGROUND

Modern hand-held devices use an accelerometer to detect a change in orientation of the device from a landscape orientation to a portrait orientation and to adjust a graphical user interface (GUI) within a display to switch between orientations. Some hand-held devices include a tilt-scroll feature wherein the GUI will slide horizontally or vertically in the plane of the display to depict a different orthogonal view in response to a tilt of the device.

SUMMARY

Accordingly, various embodiments for a tiltable user interface are described below in the Detailed Description. For example, one embodiment comprises adjusting a graphical user interface in response to a tilt of a device. In this way, a graphical user interface may have viewable content not shown in a first view, where the viewable content may be displayed in a tilted view in response to the device tilt.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
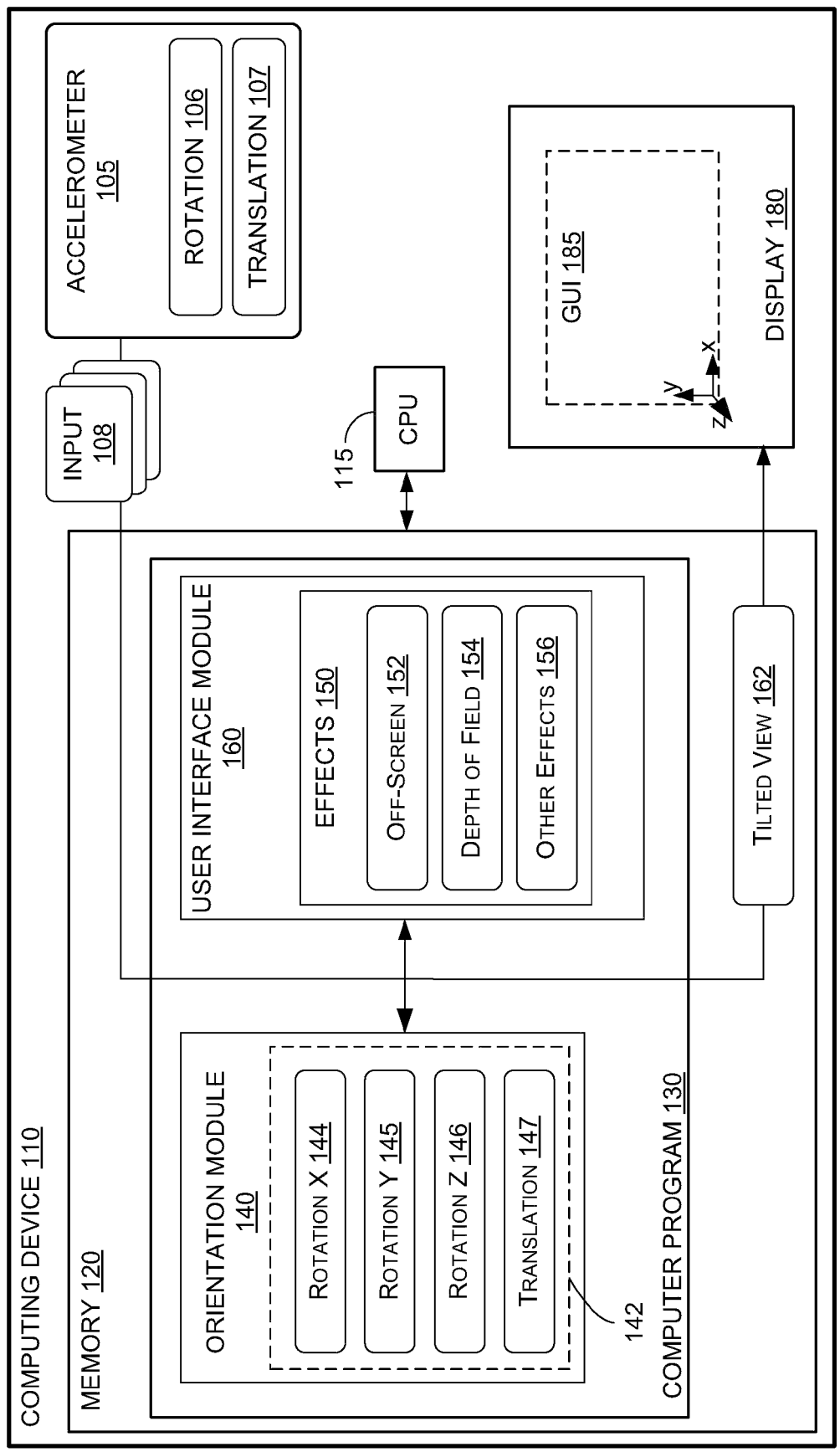
FIG. 1 shows an example of an embodiment of a system for providing a tiltable graphical user interface.

FIG. 1 shows an embodiment system 100 comprising a computing device 110 to provide a tiltable graphical user interface 185 within a display 180 in response to a detected rotation or translation of the computing device 110. Computing device 110 includes a memory 120 storing a computer program 130, and a CPU 115 in communication with the memory 120 to execute the program 130. Display 180 has a planar arrangement defined by an X-axis and a Y-axis, where a Z-axis represents a depth of the graphical user interface orthogonal to the plane of the display.

Computing device 110 includes an accelerometer 105 to detect a tilt of the display 180. For example, the accelerometer 105 may detect a rotation 106 or a translation 107 of the computing device 110 and provide an input 108 indicating a tilt of the display 180 to an orientation module 140 in the computer program 130. Other inputs may include a shake input, a roll input, or other combinations of inputs. In some embodiments, the orientation module 140 may receive an input depicting a rotation 106 or translation 107 from other position detection hardware, such as a gyroscope, a position sensing system, a global positioning system (GPS) receiver, etc. Computing device 110 also includes a user interface module 160 in communication with the display 180 and the orientation module 140 and configured to provide a tilted view 162 in response to a detected tilt.

The computing device 110 may detect a tilt having a component of rotation around at least one of the X-axis or the Y-axis. In this way, if a user intends to rotate the device around the X-axis or the Y-axis of the display but rotates the device around an axis that is not the X-axis, the Y-axis, or the Z-axis, the orientation module 140 may determine that the user intended to tilt the graphical user interface 185 according to the detected rotational component. Then, the orientation module may process the rotation 106 and determine if a user intended to tilt the graphical user interface 185.

In one example, the display 180 may show a first view in the graphical user interface 185 and the orientation module 140 may receive an input 108 from the accelerometer indicating a tilt to the computing device 110. Then, the orientation module 140 may calculate an amount of tilt 142 to be applied to the first view shown in the graphical user interface. Then, the user interface module 160 may generate a tilted view 162 including a portion of at least one graphical element that was not displayed in the first view, wherein the display 180 is configured to display the tilted view in the graphical user interface 185.

In some embodiments, a tilted view includes an icon 350 that is not displayed in the first view. For example a status icon such as a battery icon, a wireless connection icon, etc. may be viewable by tilting a device but not viewable in a first view. This allows icons that are infrequently utilized or having a changing status to be accessible yet hidden in the first view.

In some embodiments, one or more icons may move or be displayed in a different fashion from other icons or display elements. In an embodiment, status icons may move into view at a different speed than other display elements in response to a tilt or other input. As an example, a status icon may slide into view more quickly than other elements. In another example, an icon may be remain displayed on a display screen longer even when a user returns a device to a neutral state, and then may move off screen. In yet another example, an icon may optionally not be subjected to a parallax/perspective shift and may displayed with an x-axis movement, with no change in Z-depth, subject to a different set of physical rules, etc.

In some embodiments, an icon or display element may be brought into view by one motion and then adopt a different set of physical rules governing its motion. As an example, in response to a shake input, a display element may either respond to a tilt in the same fashion as the other display elements, or it may not longer respond to tilt or other inputs for a set period of time, until it is removed from the display screen, until a different input, etc.

Some embodiments may treat different layers or portions of display elements in different fashions. For example, one embodiment may include a flat foreground layer including a layer or layers designated to be excluded from a perspective shift when the device is tilted. In this example, a foreground layer may not shift while others layers below it would shift in response to a tilt or other input. In this way, a user interface may be tailored to have a natural feel, to specifically highlight certain icons, to allow programmably different effects for different icons or design elements, etc.

In some embodiments, the graphical user interface 185 depicts a 3-dimensional environment including a Z-axis orthogonal to the display 180, wherein the user interface module is configured to depict a parallax effect between a first element with a first Z component and a second element with a second Z component as the graphical user interface 185 changes between the first view and the tilted view. This also enhances the perception of depth in the graphical user interface 185. A 3-dimensional environment may include a rotation about the X-axis 144, a rotation about the Y-axis, or a rotation about the Z axis 146, or a translation 147 through any of the 3 dimensions.

Figure 2:
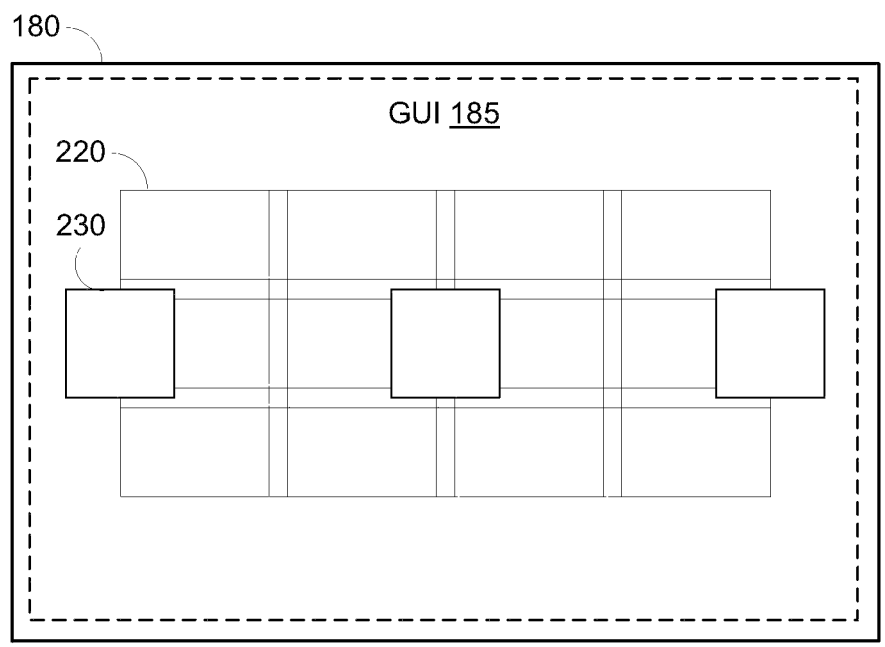
FIG. 2 shows a display including a graphical user interface with elements at different depths.
Figure 3:
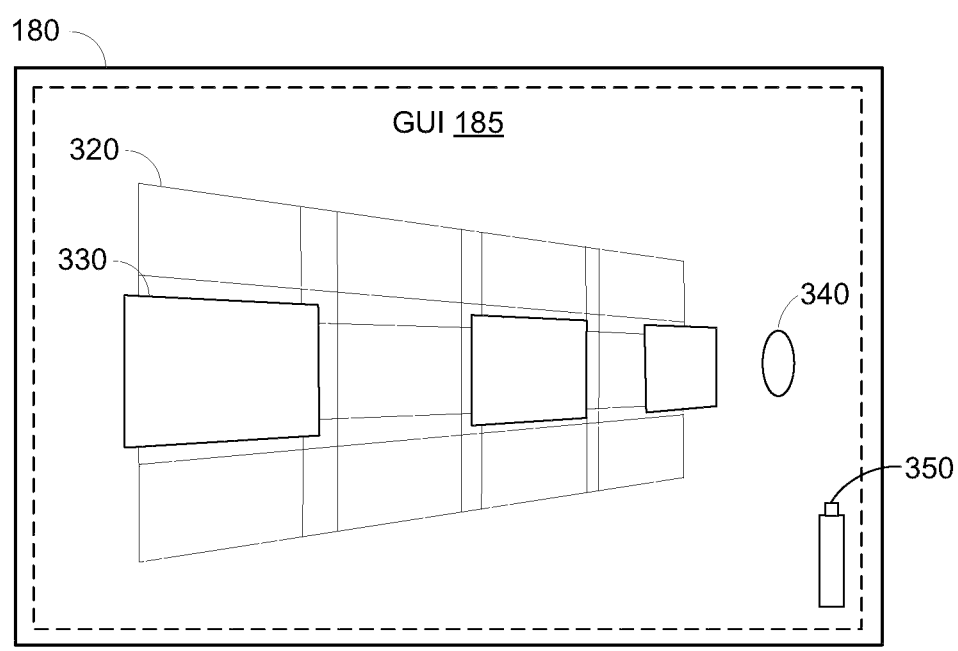
FIG. 3 shows a display including a graphical user interface with elements at different depths in a tilted view.

In an example including a 3-dimensional environment, FIG. 2 depicts a first view of graphical user interface 185 in display 180 and includes a first element 220 in the background and a second element 230 in the foreground and having a different Z component than the first element. In FIG. 3, the graphical user interface is tilted in response to a detected tilt of the computing device 110, resulting in the first element changing position with respect to the second element and providing a parallax effect as if the user rotated their view of the graphical user interface 185. Additionally, FIG. 3 includes element 340 that is not viewable in FIG. 2 but is within the same plane as the second element 330 and in front of first element 320. FIG. 3 also depicts an icon 350 that is hidden from view in the first view but is viewable in the tilted view.

FIG. 3 depicts a rotation around the Y-axis, but other embodiments are not so limited. For example, a tilt may be detected around the X-axis, around another axis within the plane of the display, or a rotation having components on X-axis, Y-axis, and Z-axis. In some embodiments, a tilt may be combined with translation, wherein the graphical user interface may depict the tilt and a scrolling to another X or Y location in the interface.

The tiltable graphical user interface depicted in FIG. 2 and FIG. 3 allows a device to have a graphical user interface 185 that is larger than the physical display 180 it is being displayed on. Further, this approach allows an interface to provide icons that are hidden from view in a first view, such as regular usage of a computing device 110, but are viewable by tilting the computing device 110.

In some embodiments, the tilted view may have a rotation point with an adjustable Z component. For example, the tilt of the graphical user interface 185 may be about a pivot point, and the pivot point may be at the Z component of the viewer, of an element in the graphical user interface, of the display, etc. An adjustable rotation point allows the look and feel of the graphical user interface to be adjusted. For example, by providing a tilt with a rotation point with a Z component the same as the display 180, the user perspective may orbit about that rotation point. By adjusting the rotation point to have a Z component similar to the user's perspective, the graphical user interface 185 will pivot with respect to the user.

User interface module 160 may also use the effects 150 to provide a depth of field 154, such as a focus depth, wherein the user interface module may adjust the focus depth in the graphical user interface 185 in response to a tilt. For example, first element 220 may be out of focus in FIG. 2, but in response to a tilt of computing device 110, the corresponding first element 320 may be brought into focus while the second element 330 is out of focus in FIG. 3. In another example, when an element or icon that was not previously displayed is tilted in to the display the focus depth may be adjusted to that element/icon.

In some embodiments, the user interface module 160 may be further configured to adjust the focus depth in the graphical user interface 185 in response to a selection of an element in the graphical user interface 185. For example, in FIG. 2 if the first element 220 is initially out of focus, the user interface module may adjust the focus to the Z component depth of the first element upon a selection of that element, and then a rotation would adjust the focus depth based upon the first element 220 being the initial focus depth.

In some embodiments, user interface module may provide other effects 156, off-screen effects 152, etc. In one example, the first view may be displayed if the tilt is below a threshold rotation. This allows a slight rotation to not be interpreted as an input, and the device to display the first view below a threshold rotation. In another example, the graphical user interface may revert to the first view after a period with no additional tilts of the device.

Figure 4:
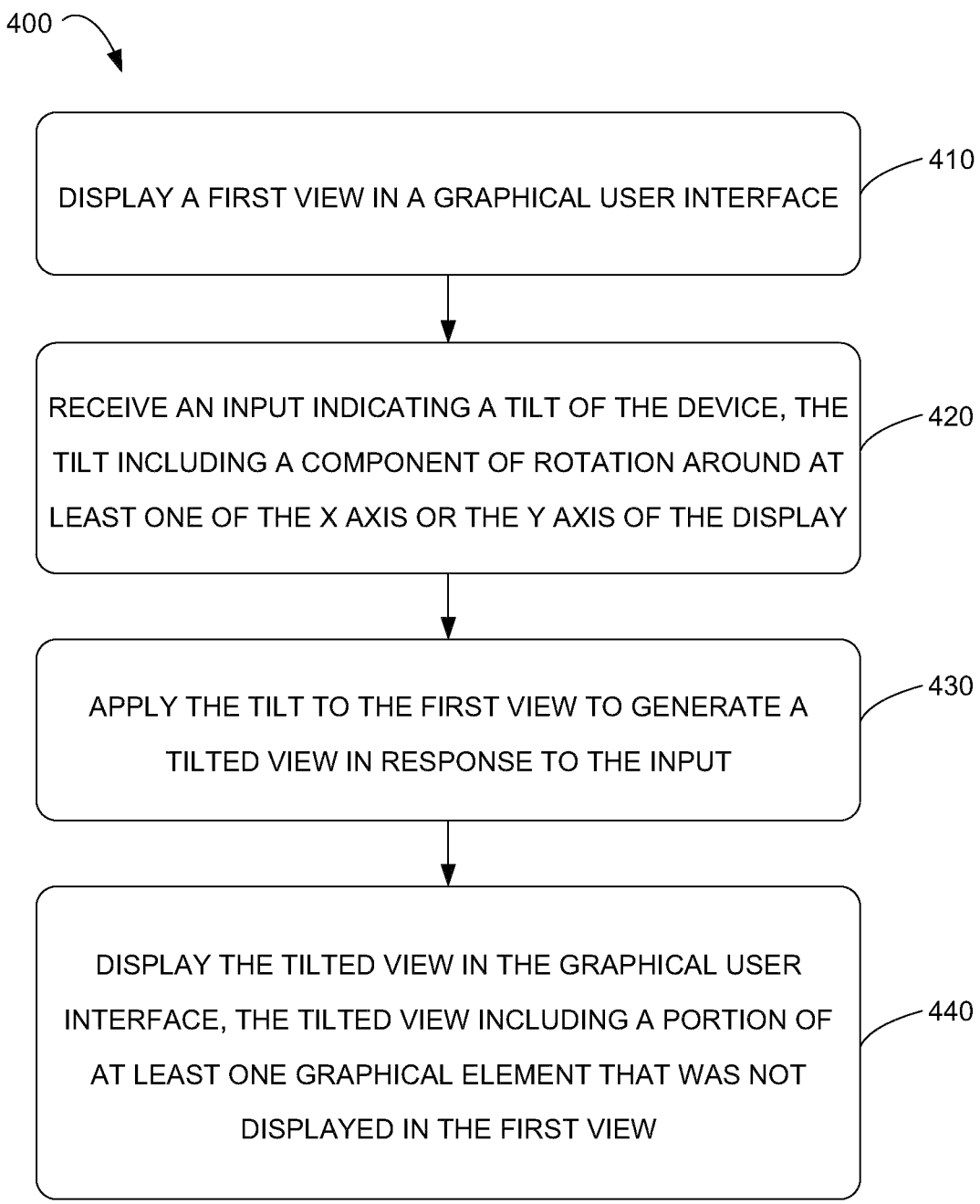
FIG. 4 shows a process flow depicting an embodiment of a method for tilting a graphical user interface within a display for a device.

Continuing with the Figures, FIG. 4 shows a flow diagram depicting an embodiment of a method 400 for tilting a graphical user interface within a display. In one example, the display may have a planar arrangement defined by an X-axis and a Y-axis. First, as indicated in block 410, method 400 comprises displaying a first view in a graphical user interface. The first view may include one or more elements within the graphical user interface and the one or more elements may have different depths with respect to a Z-axis of the display. In this example the first view is orthogonal to the plane of the display.

Method 400 then comprises receiving an input indicating a tilt of the device, the tilt including a component of rotation around at least one of the X-axis or the Y-axis of the display, as indicated in block 420. Such inputs may be, but are not limited to, rotation or translation inputs detected by accelerometer, or from other position detection hardware, such as a gyroscope, a position sensing system, a global positioning system (GPS) receiver, etc. In some embodiments, a tilt may be detected having a component of rotation around at least one of the X-axis or the Y-axis. In this way, if a user intends to rotate the device around the X-axis or the Y-axis of a display but rotates the device around an axis that is not the X-axis, the Y-axis, or the Z-axis.

Next, method 400 comprises applying the tilt to the first view to generate a tilted view in response to the input as indicated at 430.

Method 400 then comprises displaying the tilted view in the graphical user interface, the tilted view including a portion of at least one graphical element that was not displayed in the first view, as indicated in block 440.

In some embodiments, the tilted view may further comprise an icon in the tilted view that is not displayed in the first view. For example a status icon such as a battery icon, a wireless connection icon, etc. may be viewable by tilting a device but not viewable in a first view. This allows icons that are infrequently utilized or having a changing status to be accessible yet hidden in the first view.

In some embodiments, the graphical user interface may depict a 3-dimensional environment including a Z-axis orthogonal to the display, wherein the method 400 further comprises depicting parallax between a first element with a first Z component and a second element with a second Z component as the graphical user interface changes between the first view and the tilted view.

Additionally, the tilted view may have a rotation point with an adjustable Z component. For example, the tilt of the graphical user interface may be about a pivot point, and the pivot point may be at the Z component of the viewer, of an element in the graphical user interface, of a display, etc. An adjustable rotation point allows the look and feel of the graphical user interface to be adjusted. For example, by providing a tilt with a rotation point with a Z component the same as a display, a user perspective may orbit about that rotation point. By adjusting the rotation point to have a Z component similar to the user's perspective, a graphical user interface will pivot with respect to a user's perspective.

In some embodiments, the 3-dimensional environment may include a focus depth, wherein the method 400 further comprises adjusting the focus depth in the graphical user interface in response to the tilt. For example, method 400 may adjust a focus depth in the graphical user interface in response to a selection of an element in the graphical user interface, in response to a tilt of the device, etc.

Some embodiments may provide other effects. For example, method 400 may display the first view if a tilt is below a threshold rotation. This allows a slight rotation to not be interpreted as an input, and the device to display the first view below a threshold rotation. In another example, method 400 may further comprise displaying the first view after a period with no additional tilts of the device. In another example, a first tilt may be applied to the first view if the display is in a portrait orientation and a second tilt is applied to the first view if the display is in a landscape orientation.

It will be appreciated that the embodiments described herein may be implemented, for example, via computer-executable instructions or code, such as programs, stored on a computer-readable medium and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, media players and any other suitable devices such as personal computers, laptop computers, hand-held devices, cellular phones, microprocessor-based programmable consumer electronics and/or other suitable computing devices that may utilize a tiltable graphical user interface.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for tilting a graphical user interface within a display for a device, the display in a planar arrangement defined by an X-axis and a Y-axis, the method comprising:
   displaying a first view of a flat layer in the graphical user interface;
   receiving an input indicating a tilt of the device, the tilt including a component of rotation around at least one of the X-axis or the Y-axis of the display;
   applying the tilt to the first view of the flat layer to generate a tilted view of the flat layer in response to the input, the tilted view including a rotation of the first view of the flat layer around at least one of the X-axis or the Y-axis on the display;
   displaying the tilted view in the graphical user interface, the tilted view including an icon that was not displayed in the first view, wherein the first view is displayed instead of the tilted view if the tilt is below a threshold rotation and the graphical user interface depicts a 3-dimensional environment including a Z-axis orthogonal to the display; and
   depicting parallax between a first element with a first Z component and a second element with a second Z component as the graphical user interface changes between the first view and the tilted view.

2. The method of claim 1, wherein the tilted view has a rotation point with an adjustable Z component.

3. The method of claim 1, wherein the 3-dimensional environment includes a focus depth, the method further comprising adjusting the focus depth in the graphical user interface in response to the tilt.

4. The method of claim 3, further comprising adjusting the focus depth in the graphical user interface in response to a selection of an element in the graphical user interface.

5. The method of claim 1, wherein the first view is displayed if the tilt is below a threshold rotation.

6. The method of claim 1, further comprising displaying the first view after a period with no additional tilts of the device.

7. The method of claim 1, wherein a first tilt is applied to the first view if the display is in a portrait orientation and a second tilt is applied to the first view if the display is in a landscape orientation.

8. A system to provide a tiltable graphical user interface, the system comprising:
   a display including a graphical user interface, the display having a planar arrangement defined by an X-axis and a Y-axis;
   an accelerometer to detect a tilt of the display, the tilt including a component of rotation around at least one of the X-axis or the Y-axis;
   an orientation module in communication with the accelerometer, the orientation module to receive an input from the accelerometer indicating the tilt and to calculate an amount of tilt to be applied to a first view of a flat layer shown in the graphical user interface;
   a user interface module in communication with the display and the orientation module, the user interface module to generate a tilted view based on the amount of tilt applied to the first view of the flat layer and including an icon that was not displayed in the first view, wherein the display is configured to display the tilted view of the flat layer in the graphical user interface; and
   wherein the first view is displayed instead of the tilted view if the tilt is below a threshold rotation and the graphical user interface depicts a 3-dimensional environment including a Z-axis orthogonal to the display, the user interface module configured to depict parallax between a first element with a first Z component and a second element with a second Z component as the graphical user interface changes between the first view and the tilted view.

9. The system of claim 8, wherein the tilted view has a rotation point with an adjustable Z component.

10. The system of claim 8, wherein the 3-dimensional environment includes a focus depth, the user interface module further configured to adjust the focus depth in the graphical user interface in response to the tilt.

11. The system of claim 10, wherein the user interface module is further configured to adjust the focus depth in the graphical user interface in response to a selection of an element in the graphical user interface.

12. The system of claim 8, wherein the first view is displayed if the tilt is below a threshold rotation.

13. The system of claim 8, wherein a layer in the graphical user interface remains statically displayed in response to a tilt of the display.

14. A computer-readable storage medium storing instructions executable by a computing device to tilt a graphical user interface within a display for a device, the display in a planar arrangement defined by an X-axis and a Y-axis, the instructions being executable to perform a method comprising:

displaying a first view of a flat layer in the graphical user interface;

receiving an input indicating a tilt of the device, the tilt including a component of rotation around at least one of the X-axis or the Y-axis of the display;

applying the tilt to the first view of the flat layer to generate a tilted view of the flat layer in response to the input, the tilted view including a rotation of the first view around at least one of the X-axis or the Y-axis on the display; and displaying the tilted view in the graphical user interface, the tilted view including an icon that was not displayed in the first view, wherein the first view is displayed instead of the tilted view if the tilt is below a threshold rotation and the graphical user interface depicts a 3-dimensional environment including a Z-axis orthogonal to the display; and depicting parallax between a first element with a first Z component and a second element with a second Z component as the graphical user interface changes between the first view and the tilted view.

* * * * *